TELEVISION RECEIVER DEFLECTION CIRCUIT USING A CONTROLLED RECTIFIER

Filed Dec. 23, 1968

INVENTOR
THEODORE V. LESTER
BY Mueller, Aichele & Rauner
ATTYS.

United States Patent Office
3,512,040
Patented May 12, 1970

3,512, 040
TELEVISION RECEIVER DEFLECTION CIRCUIT USING A CONTROLLED RECTIFIER
Theodore V. Lester, Chicago, Ill., assignor to Motorola, Inc., Franklin Park, Ill., a corporation of Illinois
Filed Dec. 23, 1968, Ser. No. 785,912
Int. Cl. H01j 29/76
U.S. Cl. 315—27 5 Claims

ABSTRACT OF THE DISCLOSURE

A transistor biased to conduction supplies a current to television receiver deflection coils through a transformer. The current through the transformer increases with time to provide the required deflection currents. A controlled rectifier is coupled to the transistor through a capacitor and is responsive to timing pulses to turn off the transistor. A feedback winding on the transformer provides voltage for turning off the controlled rectifier and also for maintaining the transistor in its non-conducting state for a required period of time.

BACKGROUND OF THE INVENTION

Figure 1:
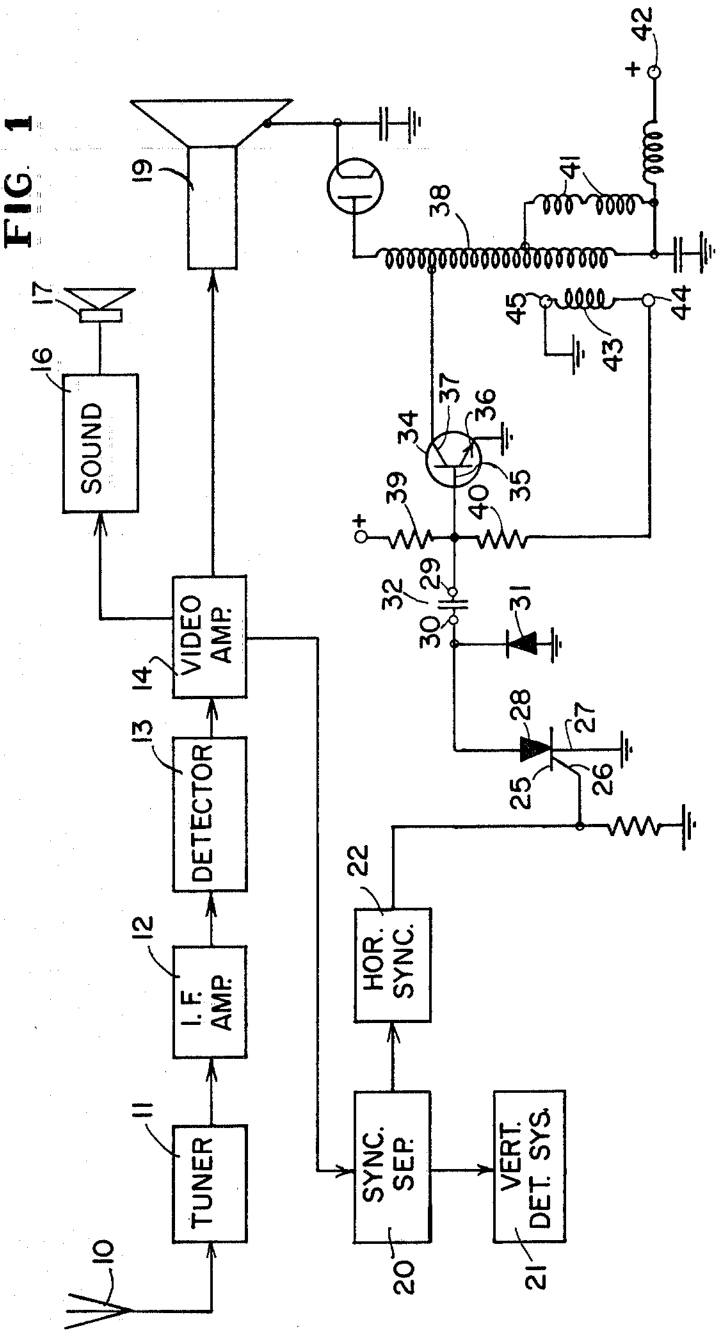

The horizontal drive circuits of a television receiver have required a relatively large number of transistor stages to furnish the driving power for an output transistor which supplies the deflection current for the cathode ray tube. For example, the drive circuit may require a pulse shaper to shape the synchronizing pulses and one or more driver transistors coupled by transformers to the output transistor. While it is possible in some types of circuits to eliminate the pulse shaper by proper design of the oscillator supplying synchronizing pulses, coupling transformers and driver transistors are still required. Further, arcs may occur in the cathode ray tube coupling back high voltages to the output transistor which may cause damage to the output transistor.

SUMMARY OF THE INVENTION

It is, therefore, an object of this invention to provide a television receiver with a horizontal deflection circuit requiring low drive power for operation.

Another object of this invention is to provide a television receiver with a simplified and improved horizontal deflection circuit.

Another object of this invention is to provide a television receiver with a horizontal drive circuit having arc protection.

In practicing this invention a transistor horizontal drive circuit for television receivers is provided. The horizontal deflection circuits for the cathode ray tube are supplied from a transformer having a secondary winding and an output transistor is coupled in series with the primary winding. A bias circuit connected to the secondary winding of the transformer supplies an initial bias current to the output transistor to permit current to flow therethrough. The flow of current through the transistor and the primary winding of the transformer develops a voltage in the secondary winding which is applied to the transistor to bias it further to conduction. The input electrode of the transistor is coupled to a silicon controlled rectifier through a capacitor and the timing pulses are applied to the control electrode of the controlled rectifier.

With the transistor conducting and supplying current to the deflection coils the current from the feedback winding acts to charge the capacitor. Triggering of the controlled rectifier acts to supply a potential through the capacitor to turn off the transistor which causes a reverse voltage to be developed in the feedback winding. This reverse voltage is applied to the output transistor to maintain the output transistor in a non-conducting condition for a required period of time. The feedback potential is also applied through the capacitor to the controlled rectifier to turn off the rectifier. A diode is supplied between the controlled rectifier and the capacitor to clamp the potential on one side of the capacitor. A second diode is coupled between the feedback transformer and the reference potential to provide low impedance path for operating currents while permitting a high impedance bias supply to provide turn on voltage to the output transistor with a minimum current drain on the power supply.

Figure 2:
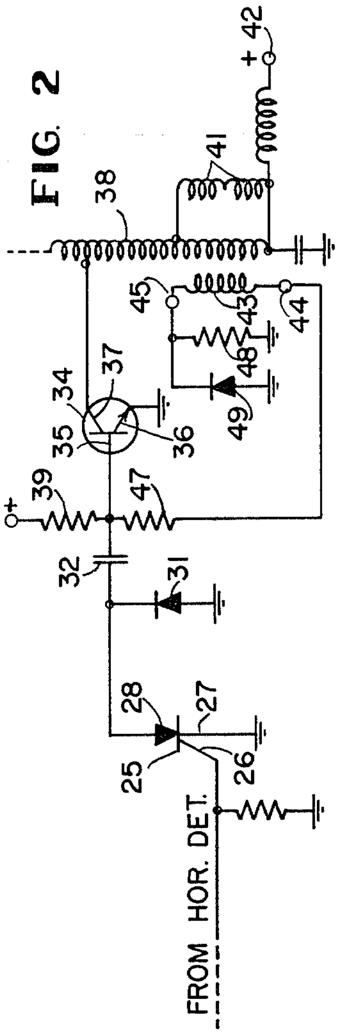

The invention is illustrated in the drawings in which:

FIG. 1 is a partial block diagram and partial schematic of a television receiver incorporating the horizontal deflection circuit of this invention; and FIG. 2 is a schematic showing a second embodiment of the invention of FIG. 1.

DETAILED DESCRIPTION OF THE INVENTION

In FIG. 1 there is shown a television receiver incorporating the horizontal deflection circuit of this invention. Signals received at antenna 10 are processed through the tuner 11, IF amplifying stages 12, detector 13 to the video amplifier 14. Video amplifier 14 separates the sound signals and they are amplified in sound amplifier 16 and reproduced by speaker 17. Video signals from video amplifier 14 are coupled to the cathode ray tube 19 and to sync signals to the vertical deflection system 21 and horizontal and vertical sync signals and couples the vertical sync signals to the vertical deflection system 21 and horizontal sync signals to the horizontal sync circuit 22. Horizontal sync circuit 22 develops horizontal synchronizing pulses at the proper time to synchronize the horizontal sweep signals.

The horizontal sync pulses are coupled to control electrode 26 of silicon controlled rectifier 25. The cathode 27 of silicon controlled rectifier 25 is coupled to ground while the anode 28 is coupled to base 35 of transistor 34 through capacitor 32. A diode 31 is connected between the capacitor 32 and ground. Collector 37 of transistor 34 is coupled to a power supply terminal 42 through transformer primary winding 40. The emitter 36 of transistor 34 is coupled to ground. A bias circuit consisting of the voltage divider resistors 39 and 40 and the transformer secondary winding 43 is connected between a positive supply and ground.

Initially resistors 39 and 40 form a voltage divider which provides a bias current to transistor 34 sufficient to cause transistor 34 to conduct. When transistor 34 conducts current flows through the primary winding 38 and induces a voltage in secondary winding 43 which is coupled to base 35. The induced voltage from secondary winding 43 is of the correct polarity to increase the conduction of transistor 34. This regenerative action causes transistor 34 to be biased rapidly to saturation. However, the current flowing through the collector-emitter circuit of the transistor 34 is less than saturation since it is controlled by the impedance of primary winding 38. Because of this current flowing through primary winding 38 increases with time and this increases in current is coupled to the deflection coils 41 to provide the desired deflection field for cathode ray tube 19.

Current through the transformer increases until the transformer will no longer support an increase in flux. At this point the voltage induced in secondary winding 43 decreases decreasing the current in the collector-emitter circuit of transsistor 34 and primary winding 38. The decrease in current through primary winding 38 causes a negative voltage to be developed at terminal 44 of secondary winding 43. This negative potential is coupled to capacitor 32 and to transistor 34 turning off the transistor. During this period of reverse bias a negative charge is accumulated on terminal 29 of capacitor 32. Diode 31 effectively clamps terminal 30 of capacitor 32 so that it cannot drop below ground potential.

Once capacitor 32 is charged the current build up will not continue until the output transformer saturates but only until the sync pulse arrives at the control gate 26 of the silicon controlled rectifier 25. The sync pulse causes silicon controlled rectifier 25 to turn on connecting the positive terminal 30 of capacitor 32 to ground. This discharges capacitor 32 into base 35 of transistor 34 turning the transistor off. The field about the primary transformer 38 will collapse and the voltages induced in the secondary winding 43 will act to bias off transistor 34 in the manner previously described.

Silicon controlled rectifier 25 will continue to be in a conductive state even when the sync pulse is removed from gate 26 unless anode 28 is made negative with respect to cathode 27. Thus when the negative voltage of the secondary winding 43 is slightly greater than the charge on capacitor 32 silicon controlled rectifier 25 is turned off. As the negative voltage from secondary winding 43 increases the capacitor 32 will be charged again.

Referring to FIG. 2 there is shown another embodiment of the invention in which terminal 45 of secondary winding 43 is coupled ot ground through resistor 48 and diode 49. When secondary winding 43 furnishes a positive potential at terminal 44 to bias on transistor 34 as previously described, current flows through diode 49 and resistor 48 is effectively bypassed. This means that the drive current for transistor 34 from secondary winding 43 is supplied from a low impedance source as is desired. Referring again to FIG. 1 where terminal 45 is connected directly to ground, in order to provide a sufficient startnig current for transistor 34 it is necessary to make both resistors 39 and 40 small. If these resistors are small a large amount of standby current will flow from the positive supply to ground through the resistors and the secondary winding 43 and the power consumption of the circuit will be excessive. If resistor 39 is made large it is necessary to make resistor 40 large in order to provide sufficient drive current from the voltage divider. However, with resistor 40 large drive current from secondary winding 43 is from high impedance source which is undesirable. This problem can be eliminated by dividing resistor 40 of FIG. 1 into the two resistors 47 and 48 of FIG. 2 so that most of the resistance is in resistor 48. This provides the high value required in order to reduce the standby current requirements for the power supply and, since resistor 48 is bypassed by diode 29, provides a low impedance circuit for the drive current from secondary winding 43.

The deflection circuit of FIGS. 1 and 2 also provides arc protection for the output transistor 34. When an arc occurs the feedback winding 43 is shorted removing the feedback signal from base 35 of transistor 34. With the feedback signal removed transistor 34 is biased to nonconduction. Thus even if transistor 34 is turned on at the beginning of a trace and an arc occurs there is no harmful effect because transistor 34 immediately cuts off.

What is claimed is:

1. A television receiver deflection circuit responsive to synchronizing signals to generate a deflection signal, the television receiver having deflection coils responsive to the deflection signal to position an elecron beam in a cathode ray tube, said deflection circuit including in combination; transformer means coupled to the deflection coils and including a secondary winding having first and second terminals, first circuit means coupling said first terminal to a reference potential transistor amplifier means having an output electrode coupled ot said transformer means and an input electrode coupled to said second terminal, a controlled rectifier having a control electrode adapted to receive the synchronizing signals, a first electrode coupled to said reference potential and a second electrode, second circuit means including capacitance means coupling said second electrode to said input electrode, bias means coupled to said input electrode for biasing said transistor amplifier means in a forward direction and first diode means connected between said second electrode and said reference potential, said first diode means being poled in a direction opposite to the polarity of said controlled rectifier with respect to said reference potential.

2. The deflection circuit of claim 1 wherein said controlled rectifier is a silicon controlled rectifier.

3. The deflection circuit of claim 2 wherein, said bias means includes first and second resistance means connected in series between a supply potential and said second terminal, said input electrode being coupled to the junction of said first and second resistance means.

4. The deflection circuit of claim 3 wherein, said first circuit means includes third resistance means and second diode means coupled between said first terminal and said reference potential.

5. The deflection circuit of claim 2 wherein, said transistor amplifier means includes a transistor having a collector electrode coupled to said transformer means, an emitter electrode coupled to said reference potential and a base electrode, said bias means includes a first resistor connected to said base electrode and a second resistor connecting said first resistor and said base electrode to said second terminal, said second circuit means includes a capacitor connecting said second electrode to the junction of said first and second resistors and said base electrode, said first diode being connected from the junction of said second electrode and said capacitor to said reference potential, an said first circuit means includes a second diode and a third resistor connected between said first terminal and said reference potential.

References Cited

UNITED STATES PATENTS

| | | |
|---|---|---|
| 2,933,642 | 4/1960 | Marley. |
| 3,205,401 | 9/1965 | Fyler. |
| 3,343,061 | 9/1967 | Hetterscheid. |
| 3,174,073 | 3/1965 | Massman. |

RICHARD A. FARLEY, Primary Examiner

J. G. BAXTER, Assistant Examiner